United States Patent
Hiratsuka

(10) Patent No.: US 6,545,208 B2
(45) Date of Patent: Apr. 8, 2003

(54) APPARATUS AND METHOD FOR CONTROLLING DISPLAY OF MUSIC SCORE

(75) Inventor: Satoshi Hiratsuka, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 10/085,676

(22) Filed: Feb. 27, 2002

(65) Prior Publication Data

US 2002/0118562 A1 Aug. 29, 2002

(30) Foreign Application Priority Data

Feb. 28, 2001 (JP) ........................................ 2001-054923

(51) Int. Cl.[7] .............................................. G09B 15/02
(52) U.S. Cl. ........................................ 84/476; 84/477 R
(58) Field of Search .............................. 84/477 R, 478, 84/483.1, 483.2, 476

(56) References Cited

U.S. PATENT DOCUMENTS

| | | | | |
|---|---|---|---|---|
| 5,400,687 A | * | 3/1995 | Ishii | 84/477 R |
| 5,604,322 A | * | 2/1997 | Kikuchi | 84/477 R |
| 6,051,769 A | * | 4/2000 | Brown | 84/477 R |
| 6,156,964 A | * | 12/2000 | Sahai et al. | 84/477 R X |

* cited by examiner

Primary Examiner—Stanley J. Witkowski
(74) Attorney, Agent, or Firm—Rossi & Associates

(57) ABSTRACT

Supply section supplies performance data of a music piece, and a processor, coupled with a display device and the supply section, controls the display device to display a music score of the music piece using a predetermined basic display block. On the basis of the supplied performance data, the processor detects music score marks included in each of predetermined music piece sections of the music piece. Then, for each of the music piece sections, the processor sets the detected music score marks to be placed in a single basic display block or dividedly in a plurality of the basic display blocks. If any one of the music piece sections includes too many music score marks, the processor dividedly allocates the music score marks to two or more basic display blocks. Thus, for each of the music piece sections, the music score marks can be displayed using a variable number of the basic display block.

11 Claims, 7 Drawing Sheets

APPARATUS AND METHOD FOR CONTROLLING DISPLAY OF MUSIC SCORE

BACKGROUND OF THE INVENTION

The present invention relates to an apparatus, method, computer program and storage medium for controlling a music score display of a music piece in accordance with progression of the music piece performed on the basis of predetermined music piece data (i.e., performance data of the music piece), which permit the music score display with increased visibility even when the music piece has complicated construction.

In cases where an automatic performance is executed on the basis of user-desired music piece data (i.e. where the user-desired music piece data are reproduced) using an electronic musical instrument, personal computer, etc., it has been known to automatically show a music score of the music piece on a screen of a display device. Namely, for a user who wants to enjoy playing or practice playing a musical instrument, such as a piano or guitar, to an automatically-performed music piece, predetermined portions of a music score of a desired music piece are sequentially displayed in accordance with progression of the automatic performance in a predetermined display style (e.g. two rows of four measures per screen). Such a music score display is very useful in that it eliminates a need for the user to take the trouble of preparing a sheet of music for each music piece to be performed, and also in that it can display a music score of even a demonstration music piece or other kind of specially arranged music piece for which there is no music score available. Further, it has also been known to display, in addition to the music score, a cursor in such a manner that the cursor moves on the displayed music score in accordance with progression of the music piece performance and thereby instruct the user to play a musical instrument, such as a piano or guitar, in accordance with a portion of the music score currently pointed to by the cursor. Such a music score display allows the user to readily practice playing a musical instrument or the like to the automatically-performed music piece. The display of the music score, cursor, etc. is controlled by a so-called music-score-display control apparatus.

In many cases, a music score display controlled by the conventional music-score-display control apparatus is intended for a simply-constructed music piece for a child or beginner and shows the whole of a music score portion corresponding to a measure of a music piece on the screen within a basic display block thereof having a fixed display width; thus, measure lines demarcating individual measures of the music piece are each always displayed at a predetermined fixed position of the corresponding measure. Therefore, if a great many score marks, such as a clef, time signature, key signature, notes and rest, are present within a measure and these score marks require more than the display width of the basic display block (such as when displaying a music score of a music piece having complicated construction that is intended for a user or player of relatively high musical skill), there would arise a problem that all of the music score marks can not be displayed appropriately within the basic display block. As one simplest approach for solving the problem encountered in displaying a music score of a music piece having complicated construction, it has been conventional to display some of adjacent score marks in an overlapping manner so that all of the score marks of each measure can be displayed completely within the basic display block. However, with the approach of displaying some of the adjacent score marks in an overlapping manner, the displayed music score tends to be very difficult for the user or player to view; that is, such a music score display tends to be very disadvantageous in terms of visibility or viewability to the user.

SUMMARY OF THE INVENTION

In view of the foregoing, it is an object of the present invention to provide a music-score-display control apparatus and method which allow a user to reliably view, with increased visibility, score marks of even a music piece having complicated construction with a great many score marks within a measure, by performing control to sequentially display a music score of the music piece in an appropriate easy-to-view style in accordance with progression of the music piece.

In order to accomplish the above-mentioned object, the present invention provides a music-score-display control apparatus which comprises: a display device;
a supply section that supplies performance data of a music piece; and a processor coupled with the display device and the supply section. The processor is adapted to: control the display device to display a music score using a predetermined basic display block; on the basis of the supplied performance data, detect music score marks included in each of predetermined music piece sections of the music piece; and for each of the music piece sections, set the detected music score marks to be placed in a single basic display block or dividedly in a plurality of the basic display blocks in such a manner that the music score marks in each of the predetermined music piece sections are displayed using a variable number of the basic display block.

Thus, if it appears that music score marks included in a given one of the predetermined music piece sections can be put appropriately in a single basic display block, these music score marks are set to be placed in the basic display block. However, if it appears that music score marks included in a given one of the predetermined music piece sections can not be put appropriately in a single basic display block, then the music score marks are set to be placed dividedly in or across a plurality of the basic display blocks. Namely, even where any one of the predetermined music piece sections includes many music score marks, the inventive arrangements allow the many music score marks to be displayed using a plurality of the basic display blocks, and thereby can effectively prevent the music score marks from being displayed overlappingly or too closely so that the music score can be displayed in an easy-to-view manner. As a result, the present invention can display a music score on the display device with increased visibility.

Further, a predetermined indicator such as a cursor, which moves in accordance with progression of a performance of a music piece, may be displayed in correspondence with a music score mark display on the display device. Thus, in addition to the music score display, respective performance timing can be displayed in correspondence with a style of the music score display, so that appropriate performance assistance can be advantageously provided to the user.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the objects and other features of the present invention, its embodiments will be described in greater detail hereinbelow with reference to the accompanying drawings, in which.

DETAILED DESCRIPTION OF EMBODIMENTS

Figure 1:
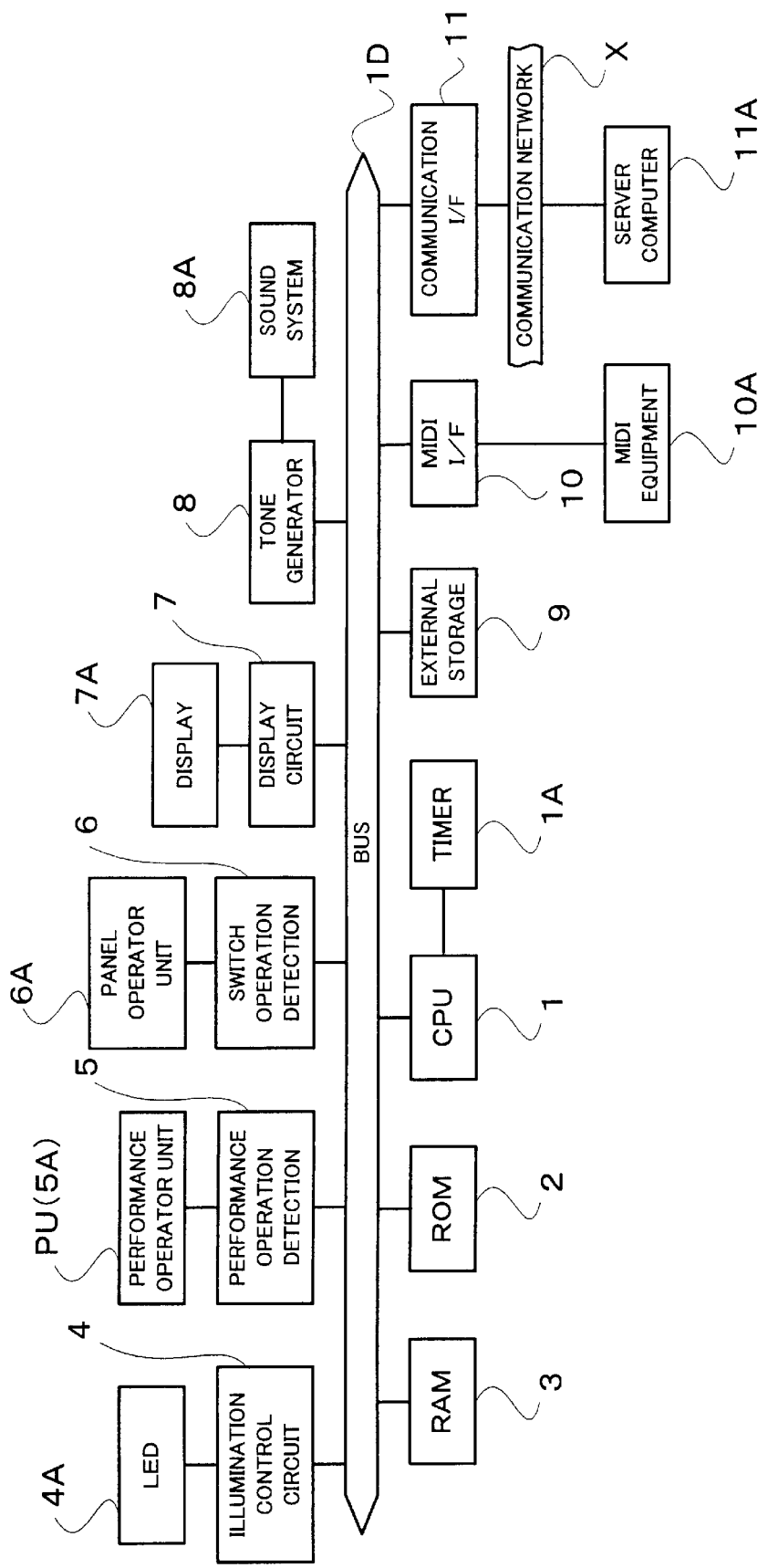
FIG. 1 is a block diagram illustrating a general hardware setup of an electronic musical instrument including a music-score-display control apparatus of the present invention.

FIG. 1 is a block diagram illustrating a general hardware setup of an embodiment of an electronic musical instrument including a music-score-display control apparatus of the present invention.

In the electronic musical instrument, various processes are carried out under control of a microcomputer comprising a microprocessor unit (CPU) 1, a read-only memory (ROM) 2 and a random-access memory (RAM) 3. The electronic musical instrument will hereinafter be described as using the single CPU 1 to perform the various processes, such as an automatic performance process for automatically performing a music piece on the basis of music piece data (i.e., performance data of the music piece) and a music score display process for visually displaying a music score of the music piece in accordance with progression of the automatically-performed music piece. The CPU 1 controls behavior of the entire electronic musical instrument. To the CPU 1 are connected, via a data and address bus 1D, the read-only memory (ROM) 2, random-access memory (RAM) 3, illumination control circuit 4, performance operation detection circuit 5, switch operation detection circuit 6, display circuit 7, tone generator (T.G.) circuit 8, external storage device 9, MIDI interface (I/F) 10 and communication interface 11. Also connected to the CPU 1 is a timer 1A for counting various time periods to signal interrupt timing for timer interrupt processes in the electronic musical instrument. Namely, the timer 1A generates tempo clock pulses for counting a time interval or setting a performance tempo with which to automatically perform a music piece. Such tempo clock pulses generated by the timer 1A are given to the CPU 1 as interrupt instructions, and the CPU 1 carries out the automatic performance process in accordance with such instructions (i.e., as a timer interrupt process).

The ROM 2 has prestored therein various programs to be executed by the CPU 1 and various data to be referred to by the CPU 1. The RAM 3 is used as a working memory for temporarily storing various automatic-performance-related information and various data generated as the CPU 1 executes a program, a memory for storing the currently-executed program and data related thereto, and the like. Predetermined address regions of the RAM 3 are allocated and used as registers, flags, tables, memories, etc.

A plurality of LEDs (Light-Emitting Diodes) 4A are provided in corresponding relation to a plurality of performance operators 5A of a performance operator unit PU, and the LEDs 4A are turned on (illuminated) or turned off (deilluminated) in accordance with progression of an automatically-performed music piece so as to indicate a performance operator to be next operated by a user or player. The illumination control circuit 4 can apply a continuous or pulse-like voltage to each of the LEDs 4A, provided in corresponding relation to the performance operators 5A, under the control of the CPU 1, and thus can illuminate or deilluminate a predetermined one of the LEDs 6. Also, under the control of the CPU 1, the illumination control circuit 4 can adjust the voltage to be applied so as to set a desired luminance of the predetermined LED 4A. That is, the electronic musical instrument shown in FIG. 1 provides visual performance assistance to the user or player through illumination and deillumination of the LEDs 4A.

The performance operator unit PU comprises, for example, a keyboard including, as the performance operators 5A, a plurality of keys for selecting a pitch of a tone to be generated and also including key switches corresponding to the keys. This performance operator unit PU can be used not only for such a tone performance, but also as a means for inputting pitches and rhythm of a melody for an automatic performance. The performance operation detection circuit 5 detects depression and release of the keys on the performance operator unit PU and thereby produces corresponding detection outputs. Panel operator unit 6A includes various switches and operators for selecting a music piece data set to be automatically performed, selecting a music score display mode, selecting a performance guide mode, selecting an automatic performance mode and inputting various performance conditions to be used for an automatic performance based on the music piece data. Of course, the panel operator unit 6A may include a ten-button keypad for entry of numeric value data to be used for selecting, setting and controlling a tone pitch, color, effect, etc. and a keyboard for entry of text data. The switch operation detection circuit 6 constantly detects respective operational states of the individual operators on the panel operator unit 6A and outputs switch information, corresponding to the detected operational states of the operators, to the CPU 1 via the data and address bus 1D. The display circuit 7 visually displays various information, such as a music score of a music piece being automatically performed, on a display device 7A that may comprise an LCD (Liquid Crystal Display) or CRT (Cathode Ray Tube). In addition, the display circuit 7 displays on the display device 7A various performance conditions for an automatic performance, as well as controlling states of the CPU 1, etc. In the electronic musical instrument of FIG. 1, a music score corresponding to progression of a performance of a music piece is displayed on the display device 7A.

The tone generator (T.G.) circuit 8, which is capable of simultaneously generating tone signals in a plurality of channels, receives music piece data supplied via the data and address bus 1D and generates tone signals based on the received music piece data. Each of the tone signals thus generated by the tone generator circuit 8 is audibly reproduced or sounded by a sound system 8A including amplifiers and speakers. Predetermined effects may be imparted, by an effect circuit or the like (not shown), to the tone signals generated by the tone generator circuit 8. The music piece data may be either in a digital coded format such as the MIDI format or in a waveform sample data format such as the PCM, DPCM or ADPCM format. The tone generator circuit 8, effect circuit (not shown) and sound system 8A may each be of any suitable conventionally-known construction.

The external storage device 9 is provided for storing data relating to control of the various programs and the like for execution by the CPU 1. Where a particular control program is not prestored in the ROM 2, the control program may be prestored in the external storage device (e.g., hard disk device) 9, so that, by reading the control program from the external storage device 9 into the RAM 3, the CPU 1 is allowed to operate in exactly the same way as in the case where the particular control program is stored in the ROM 2. This arrangement greatly facilitates version upgrade of the control program, addition of a new control program, etc. The external storage device 9 may use any of various removable-type media other than the hard disk (HD), such as a floppy disk (FD), compact disk (CD-ROM or CD-RAM), magneto-optical disk (MO), digital versatile disk (DVD) and semiconductor memory.

The MIDI interface (I/F) 10 is provided for inputting or outputting music piece data, complying with the MIDI standard (MIDI data), from or to other MIDI equipment 10A or the like external to the electronic musical instrument. Further, the communication interface 11 is connected to a communication network X, such as a LAN (Local Area Network), the Internet or telephone line network, via which it may be connected to a desired sever computer 11A so as to input a control program and music piece data from the sever computer 11A to the electronic musical instrument. Thus, in a situation where a particular control program and various data are not contained in the ROM 2 or external storage device (e.g., hard disk) 9, these control program and data can be downloaded from the server computer 11A via the communication interface 11. In such a case, the electronic musical instrument, which is a "client", sends a command to request the server computer 11A to download the control program and various data by way of the communication interface 11 and communication network X. In response to the command from the client, the server computer 11A delivers the requested control program and data to the electronic musical instrument via the communication network X. The electronic musical instrument receives the control program and data via the communication interface 11 and accumulatively store them into the external storage device (e.g., hard disk) 9. In this way, the necessary downloading of the control program and various data is completed.

Note that the MIDI interface 10 may be a general-purpose interface rather than a dedicated MIDI interface, such as RS232-C, USB (Universal Serial Bus) or IEEE1394, in which case other data than MIDI event data may be communicated at the same time. In the case where such a general-purpose interface as noted above is used as the MIDI interface 10, the other MIDI equipment 10A may be designed to communicate other data than MIDI event data. Of course, the musical information handled in the instant embodiment may be of any other data format than the MIDI format, in which case the MIDI interface 10 and other MIDI equipment 10A are constructed in conformity to the data format employed.

Figure 2:
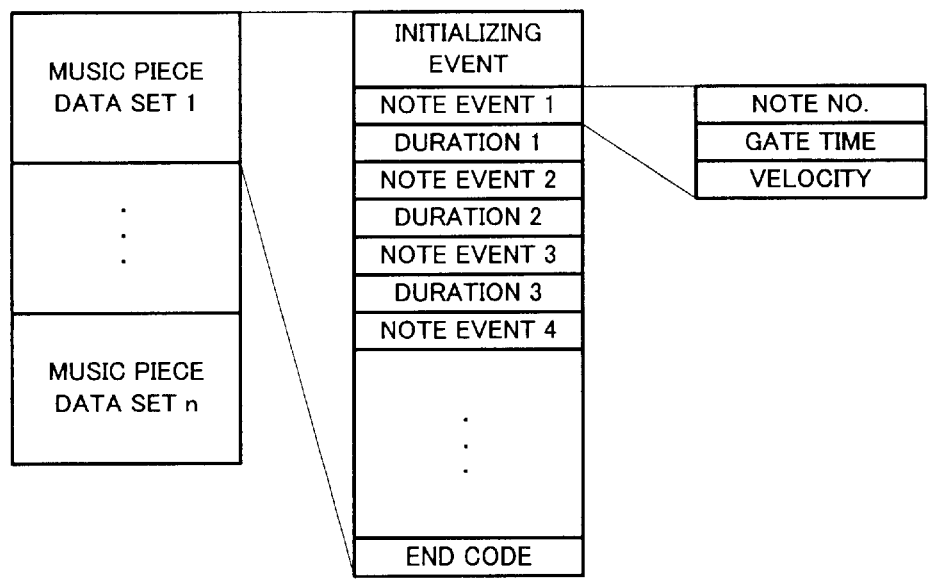
FIG. 2 is a conceptual diagram showing an exemplary organization of music piece data to be used by the electronic musical instrument.

The following paragraphs describe an exemplary organization of music piece data to be used by the electronic musical instrument of FIG. 1 for an automatic performance, with reference to FIG. 2. According to the illustrated example of FIG. 2, "music piece data set 1"–"music piece data set n" of a plurality of music pieces are stored successively in memory.

Each of the music piece data sets comprises data that are used as control information for tone generation and music score display in an automatic performance. Specifically, each of the music piece data sets includes initializing event data, note event data ("note event data 1" . . . ), duration data ("duration data 1" . . . ) and end code. The initializing event data are event data pertaining to various pieces of control information, such as those indicative of a tone color, tempo, musical key and musical time, that are used to reproduce the music piece data set. If a musical key is defined in the initializing event data, the key signature is displayed in a music score display in accordance with the data. In case no musical key is defined in the initializing event data, the musical key is automatically identified from the entire music piece data set and the key signature of the thus-identified musical key is displayed in the music score display. Further, a key signature is displayed in accordance with a pre-defined musical key (e.g., "F major"). Time signature is also displayed in the music score display in a similar manner to the key signature. Namely, if a musical time is defined in the initializing event data, the time signature is displayed in the music score display in accordance with the data, while if no musical time is defined in the initializing event data, the musical time is automatically identified from the entire music piece data set and the time signature of the thus-identified musical time is displayed in the music score display.

Each of the note event data ("note event data 1" . . . ) is performance event data representative of a note-related event such as a note-on or note-off event. The note event data includes data indicative of a note number, gate time, velocity and the like. The note number is a number expressed in semitones and imparted, for convenience sake, to a note to indicate a tone pitch; for example, note number "48" is imparted to C2, "60" to C3, and so on. Thus, note marks are positioned in the music score display at respective positions representative of appropriate tone pitches.

The gate time is data indicative of a tone-generating or sounding time length of a note, in accordance with which a note mark of an appropriate note type (e.g., quarter note, 16th note or the like) can be placed at an appropriate tone pitch position in the music score display. The velocity is data indicative of intensity of a tone. Each of the duration data ("duration 1", . . . ) is data indicative of generation timing of note event data either in an absolute time from the beginning of the music piece or measure, or in a relative time from last or immediately-preceding note event data. In accordance with such duration data, an absolute display position from the beginning of the music piece or measure or a relative display position to an adjacent note mark is determined, and a note mark can be placed on the basis of the display position. In such a case, a rest mark, in addition to the note mark, may be additionally placed automatically on the basis of relationship between the duration data and the gate time data. Of course, the automatic addition of the rest mark may be dispensed with if note event data pertaining to the rest is prestored in the music piece data. The end code is data indicative of the end of the music piece data set in question. Namely, because a number of different music piece data sets are stored in succession in the instant embodiment, the end codes serve to indicate the respective ends of the music piece data sets.

Note that each of the music piece data sets comprises a mixture of data of a plurality of channels corresponding to a plurality of performance parts, such as a part to be performed with a left hand and a part to be performed with a left hand. Thus, a separate music score may be displayed for each performance part. If any clef (such as a G clef or F clef) is not defined in the music piece data, a clef is automatically selected in accordance with the note event data (specifically, tone pitches) for each of the performance parts, and the thus-selected clef is displayed.

In the electronic musical instrument arranged in the above-described manner, various operations are carried out by the CPU 1 for displaying a music score of a music piece automatically performed on the basis of a selected one of the music piece data sets stored in memory. The various processes, including a music score display process, are carried out by the CPU 1 executing predetermined computer software programs. Of course, the various processes may be carried out by microprograms executed by a DSP (Digital Signal Processor), rather than the computer software programs. In another alternative, the various processes may be carried out by a dedicated hardware apparatus including discrete circuits, integrated or large-scale integrated circuit or gate arrays.

Figure 3:
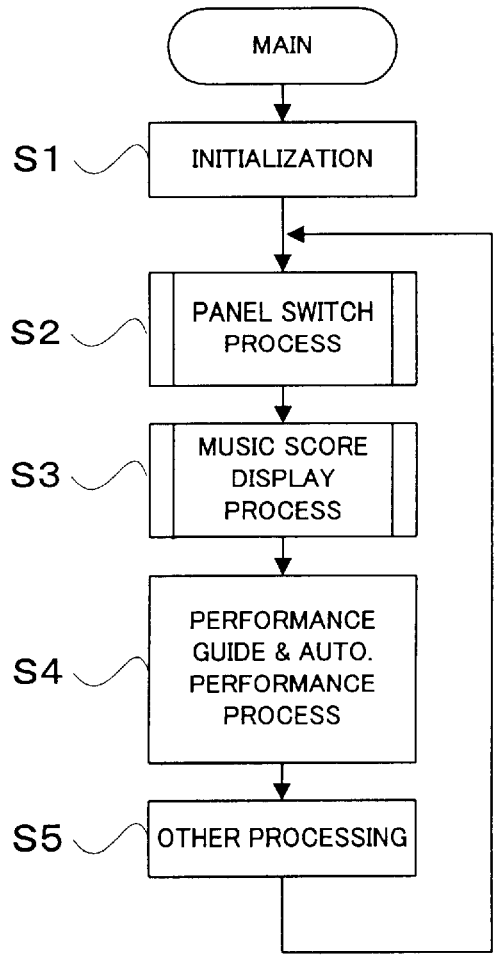
FIG. 3 is a flow chart showing an exemplary step sequence of main processing carried out by a CPU in the electronic musical instrument of FIG. 1.

Now, with reference to FIG. 3, a description will be made about main processing that includes various processes, such as the music score display process, performance guide process and automatic performance process. FIG. 3 is a flow chart showing an exemplary step sequence of the main processing carried out by the CPU 1 in the electronic musical instrument. The main processing is started up by powering on the electronic musical instrument and terminated by powering off the electronic musical instrument.

At step S1, an initialization process is performed; namely, execution of a predetermined program is initiated upon powering-on of the electronic musical instrument, and various initialization operations, such as clearing of stored contents of the RAM, are carried out. For example, the initialization process in the instant embodiment clears or resets, to predetermined initial values, respective stored contents of the registers, flags, tables and memories in the RAM 3, parameters stored in the RAM 3 and various other settings. Further, the initialization process clears the MIDI interface 10, communication interface 11, timer 1A, etc. shows a predetermined initial screen on the display device 7A, and so on. At step S2, a panel switch process is carried out. The panel switch process is intended to set or instruct, using the panel operator unit 5A, various operations to be carried out in the electronic musical instrument. Such operations in the panel switch process include an operation for reading out music piece data from the external storage device 9 in accordance with a user selection, operation for making a selection as to whether or not to display a music score of a music piece, operation for making a selection as to whether or not to execute a performance guide, operation for instructing a start and end of an automatic performance and operation for entering performance conditions to be used for an automatic performance, as will be later described in relation to FIG. 4.

At next step S3, the music score display process is carried out. The music score display process is intended to sequentially display pages of a music score, previously created on the basis of a music piece data set selected by the user, on the display device 7A in accordance with progression of a performance of the music piece; details of this music score display process will be later described in relation to FIG. 8. In the case where the selection has been made to execute a performance guide, i.e. where the performance guide has been selected, a cursor is displayed, in a predetermined display style, to point to a currently-performed position on the music score in accordance with progression of the music piece performance. When the cursor has arrived at the end of the displayed music score, the currently-displayed page of the music score is replaced with a next page of the music score, and the cursor is moved to the beginning of the next page. Even when music score marks included in a measure have been displayed dividedly in or across a plurality of basic display blocks, the cursor can always accurately point to a current automatically-performed position on the music score by displaying the cursor while varying a moving speed of the cursor in accordance with a displayed width of each individual measure. Thus, the instant embodiment can accurately indicate each performance timing to the user irrespective of the style in which the music score is displayed. Namely, the instant embodiment provides visual performance assistance or guide to the user by moving the cursor on the music score exhibited on the display device 7A.

At following step S4, the performance guide and automatic performance processes are carried out. The performance guide process is intended to provide a visual performance guide corresponding to a selected performance guide mode, such as a one-hand guide mode, both-hand guide mode or non-guide mode, on the basis of a user-selected music piece data set. For example, when a left-hand (or right-hand) guide is selected in the one-hand guide mode, the light-emitting diodes (LEDs) 4A, provided in corresponding to the performance operators 5A of the operator unit PU, are illuminated or deilluminated in accordance with the music piece data for the left-hand performance part (or right-hand performance part), to thereby give the user visual performance instructions as regards the performance operators 5A to be manipulated by the left hand (or right hand) of the user. Namely, in the instant embodiment, the performance guide is provided to the user not only by moving the cursor on the music score displayed on the display device 7A, but also by illuminating or deilluminating the LEDs 4A provided in corresponding to the performance operators 5A. The automatic performance process, carried out along with the above-described performance guide process, is intended to execute an automatic performance of the user-selected music piece data set in a performance style corresponding to the performance guide mode. For example, when the left-hand (or right-hand) guide is selected in the one-hand guide mode, a performance of only the left-hand performance part (or right-hand performance part) is muted; namely, the music piece data for the left-hand performance part (or right-hand performance part) are reproduced but not actually sounded. When the both-hand guide mode is selected, performances of both the left- and right-hand performance parts are muted. Further, when the non-guide mode is selected, performances of all the performance parts are executed.

Other necessary processing than the above-mentioned is carried out at next step S5. The operations at these steps S1-S5 are carried out repeatedly until the electronic musical instrument is powered off.

Figure 4:
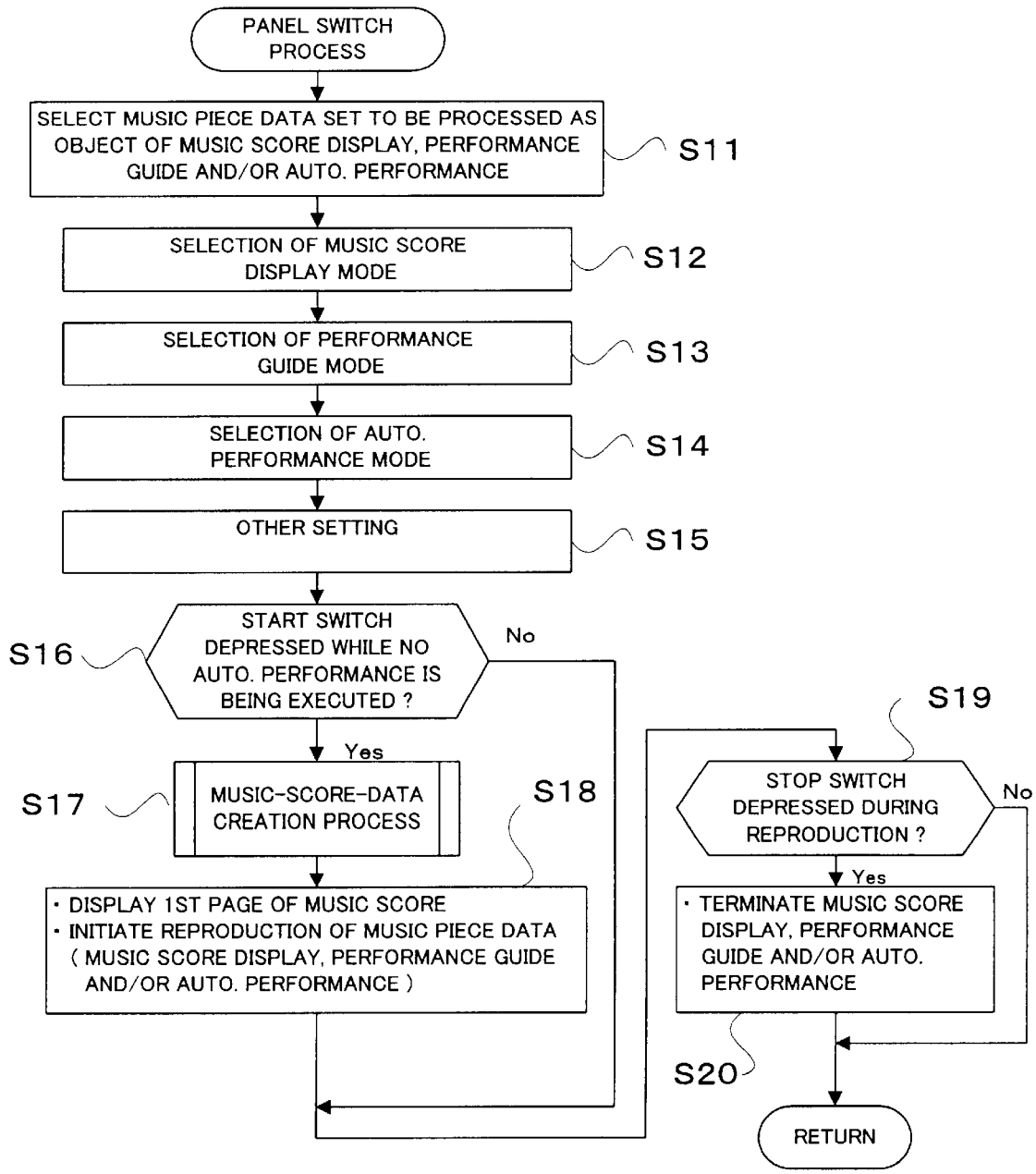
FIG. 4 is a flow chart showing an exemplary step sequence of a panel switch process carried out in the main processing of FIG. 3.

The following paragraphs describe the details of the panel switch process carried out at step S2 of the main processing of FIG. 3, with reference to FIG. 4 that is a flow chart showing an exemplary step sequence of the panel switch process.

At step S11, a music piece data set is selected which is to be an object of a music score display and performance guide and/or automatic performance. For this purpose, the user gives an instruction as to whether any one of the music piece data sets stored in the external storage device (e.g., hard disk) 9 should be selected and used as the object of the music score display and performance guide and/or automatic performance or another music piece data set should be newly downloaded and used as the object. In the latter case, any one of download sources, such as the other MIDI equipment 10A and server computer 11A, is selected so as to select a user-desired music piece data set from a listing of music piece data sets stored in the selected download source. Once the user-desired music piece data set is selected, it is downloaded from the download source to the electronic musical instrument of the invention for storage in the external storage device 9 or the like. At next step S12, the user selects the music score display mode, and a determination is made as to whether or not the user has selected execution of a music score display in accordance with progression of a performance of the music piece. If the music score display mode has been selected by the user, the user further selects a display size of the music score. Here, the user can select either a first display size in which four rows of two measures can be simultaneously displayed (i.e., eight measures are displayed as a page of the music score) or a second display size in which four rows of four measures can be simultaneously displayed (i.e., 16 measures are displayed as a page of the music score).

At next step S13, the user selects the performance guide mode, and a determination is made as to whether or not the user has selected execution of the performance guide. If determined in the affirmative at step S13, the user further selects a desired type of the performance guide mode, such as the one-hand guide mode or both-hand guide mode. If the one-hand guide mode has been selected by the user, a visual performance guide for either the left-hand performance part or the right-hand performance part is provided in accordance with progression of a performance of the music piece. If the both-hand guide mode has been selected, visual performance guides for the left- and right-hand performance parts are provided in accordance with progression of the music piece performance. At following step S14, the user selects the automatic performance mode, and a determination is made as to whether or not the user has selected execution of an automatic performance of the music piece. Once the automatic performance mode is selected, user's depression of the automatic performance start switch can initiate an automatic performance, and depression of the automatic performance stop switch can terminate the automatic performance. Then, at step S15, other setting processing is carried out. Here, the other setting processing includes various setting operations performed in accordance with detected operating states of the operators on the panel operator unit 6A, such as one for setting a tempo for the music score display and performance guide or automatic performance and one for setting various performance conditions.

At next step S16, a determination is made as to whether the automatic performance start switch has been depressed while no automatic performance is being executed, i.e. whether an instruction has been given for starting an automatic performance. If the automatic performance start switch has been depressed as determined at step S16 (YES determination at step S16), a music-score-data creation process is carried out at step S17. The music-score-data creation process is intended to create music score data that are to be used for displaying a music score, page by page, on the display device 7A. Details of the music-score-data creation process will be given later in relation to FIG. 5.

At following step S18, the automatic performance based on the music piece data is initiated, the music score display is initiated if the music score display mode is currently selected through the operation of step S12 above, and the visual performance guide is initiated if the performance guide mode is currently selected through the operation of step S13 above. Namely, when the performance guide mode is selected, a first page of the music score is displayed on the basis of the created music score data. When the performance guide mode is selected, the visual performance guide is initiated on the basis of the music piece data. If, on the other hand, the automatic performance start switch has not been depressed as determined at step S16 (NO determination at step S16), the CPU 1 jumps to step S19. Namely, if initiation of the automatic performance has not been instructed, neither the automatic performance nor the performance guide is carried out, and music score data need not be created because there is no need to display the music score. Therefore, the CPU 1 jumps to step S19 without executing the operations of steps S17 and 18. At step S19, it is determined whether or not the automatic performance stop switch has been depressed during reproduction of the music piece data (i.e., during the automatic performance of the music piece). If the automatic performance stop switch has been depressed as determined at step S19, the current automatic performance and the music score display, performance guide, etc., carried concurrently with the automatic performance, are terminated at the same time, at step S20. If, on the other hand, the automatic performance stop switch has not been depressed (NO determination at step S19), the operation of step S20 is omitted. Namely, as long as the automatic performance is being executed, the music score display and performance guide are continued.

Figure 5:
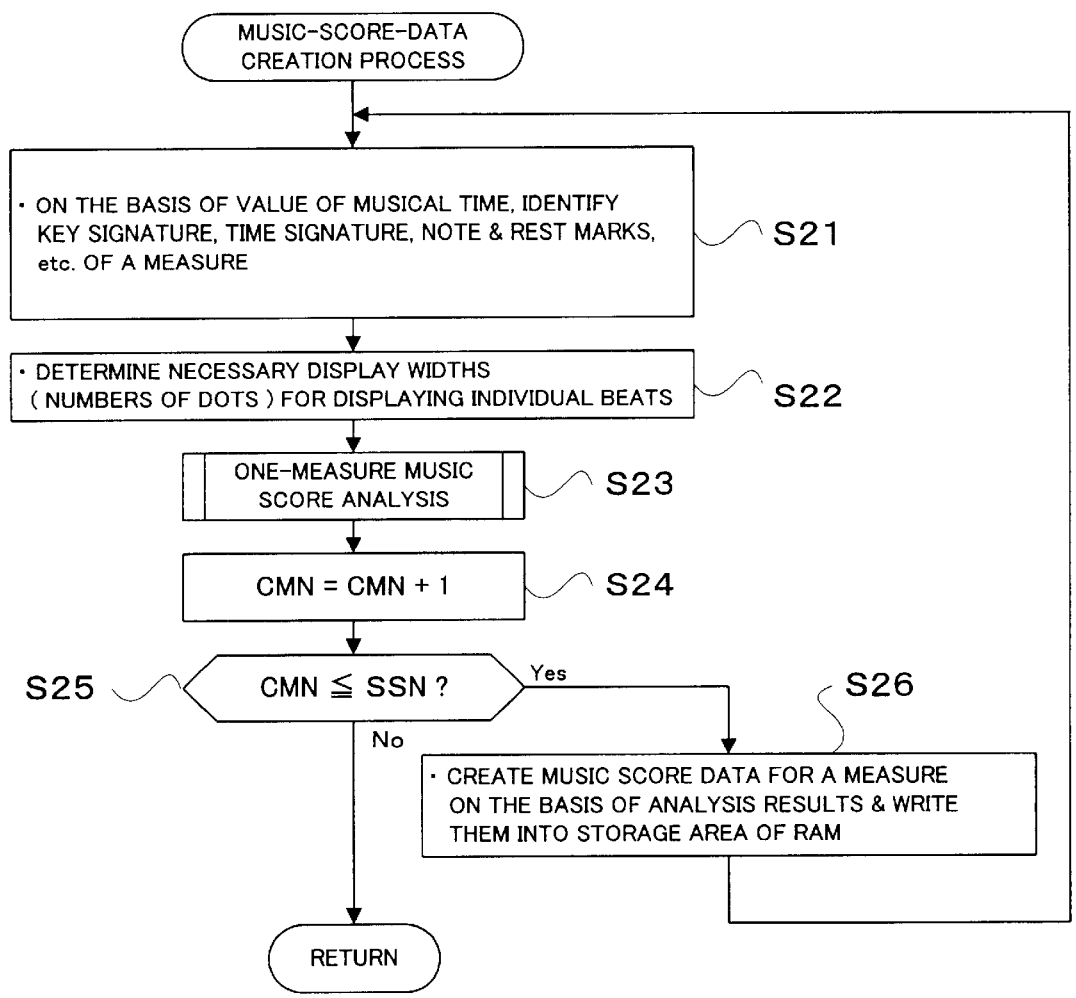
FIG. 5 is a flow chart showing an exemplary step sequence of a music-score-data creation process carried out in the panel switch process of FIG. 4.

The following paragraphs describe the details of the music-score-data creation process carried out at step S17 of the above-described panel switch process of FIG. 4, with reference to FIG. 5. FIG. 5 is a flow chart showing an exemplary step sequence of the music-score-data creation process.

At step S21, the musical time and key defined by the initializing event data included in the music piece data set or automatically-identified musical time and key are obtained, so as to identify a key signature and time signature corresponding to the music piece data of one measure. Further, on the basis of the obtained musical time, the note event data included in the music piece data of the one measure are obtained, so as to identify note marks, rest marks. For example, assuming that the musical time stored in the initializing event data is "4/4", notes are identified from the note event data of the music piece data corresponding to a length of four beats on the basis of the gate time and duration data of the note event data, and a rest mark is identified on the basis of the thus-identified notes and duration data. In this way, it is possible to identify a musical construction of the one measure. Then, at step S22, a display width, e.g. a particular number of dots, necessary for displaying all the music score marks for the individual beats (e.g., key signature, time signature, note marks and rest mark) is determined on the basis of the thus-identified musical construction of the one measure.

Then, at step S23, a one-measure score mark analysis process is carried out to analyze music score marks of the one measure of the music score for the display purpose. Normally, all music score marks of a measure are displayed within a single basic display block; however, if too many music score marks are packed in one measure, then it is difficult to display all the music score marks within the single basic display block with no unwanted overlap between the score marks. Therefore, in such a case, the music score marks included in the music piece data for the one measure are displayed dividedly across two or more basic display blocks, rather than just one basic display block, according to the instant embodiment of the invention. Among the music score marks to be considered here are a clef, time signature, key signature, note marks (including head information, tail or stem information, etc.) and rest mark that are to be shown on the musical staff. Thus, in the instant embodiment, the CPU 1 determines a necessary display width for each individual music score mark and ascertains whether or not the sum of the necessary display widths of the individual music score marks falls within (i.e., is smaller than) the width of the basic display block. If the sum of the necessary display widths of the individual music score marks does not fall within the width of the basic display block, then the music score marks of the one measure are divided so as to place the score marks dividedly in two or more basic display blocks. Details of the one-measure score mark analysis process will be described later in relation to FIG. 6.

At following step S24, a value "1" is added to a measure number CMN that represents a measure being currently analyzed. Then, at step S25, a determination is made as to whether the current measure number CMN is equivalent to or smaller than the total number of measures SSN in the entire music piece data set. If the current measure number CMN is equivalent to or smaller than the total number of measures SSN (YES determination at step S25), music score data for one measure are created on the basis of results of the analysis executed at step S23 above and then written into a predetermined storage area of the RAM 3, at step S26. Once the writing, into the RAM 3, of the music score data has been completed, the CPU 1 reverts to step S21 in order to create music score data for a next measure. If, on the other hand, the current measure number CMN is greater than the total number of measures SSN (NO determination at step S25), this means that the music score data creation has been completed for all the measures in the music piece data set, and thus the music-score-data creation process is brought to an end.

In the above-described manner, the music score data for use in displaying the music score on the basis of the music piece data per measure can be created and stored in the RAM 3 with a page number added to every predetermined portion of the music score data. At the same time, the total number of the pages is stored in the music score data. In the later-described music score display process of FIG. 8, a music score is displayed by sequentially reading out the music score data, page by page, from the RAM 3 in accordance with progression of a performance of the music piece.

Figure 6:
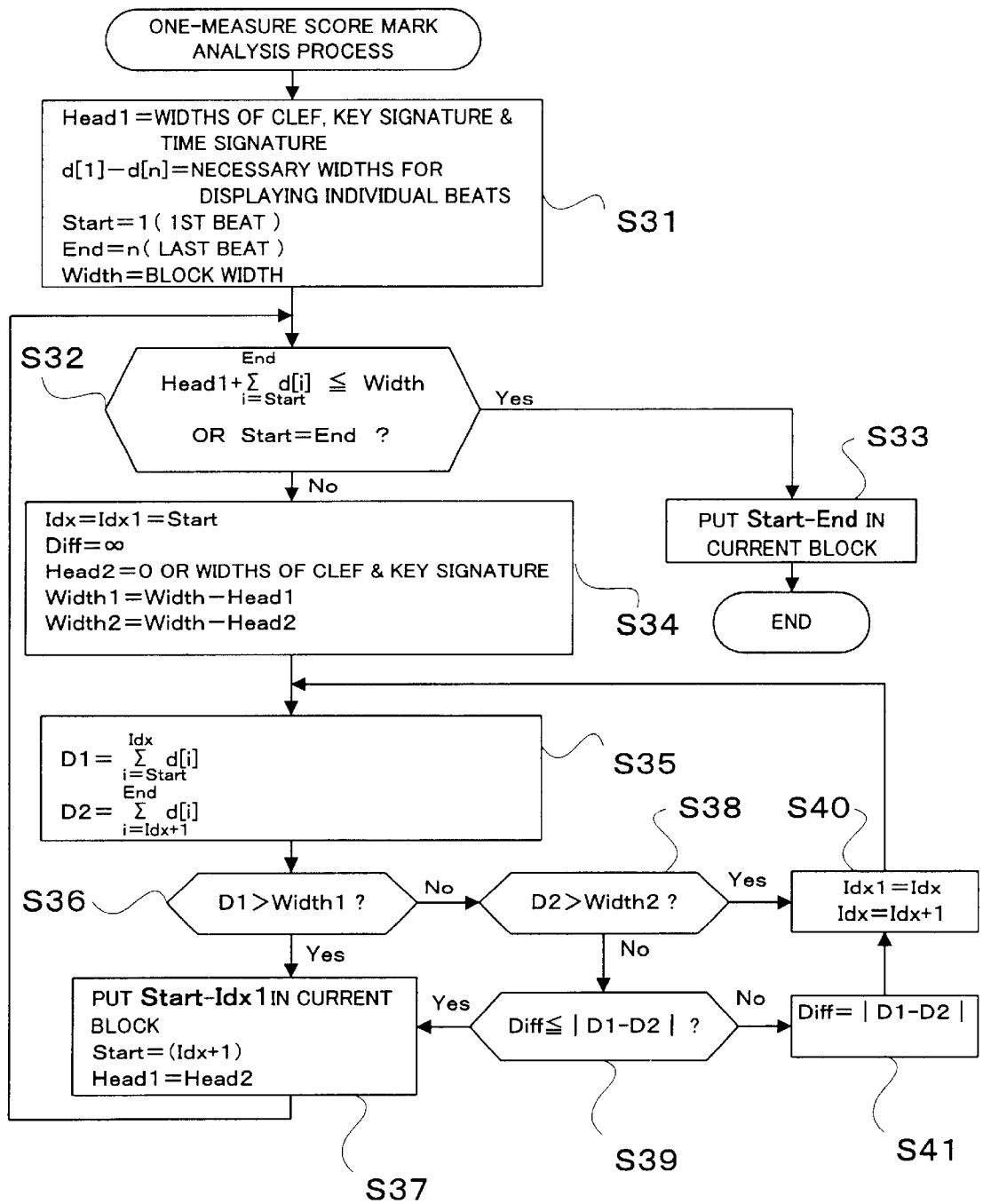
FIG. 6 is a flow chart showing an exemplary step sequence of a one-measure score mark analysis process carried out in the music-score-data creation process of FIG. 5.
Figure 7:
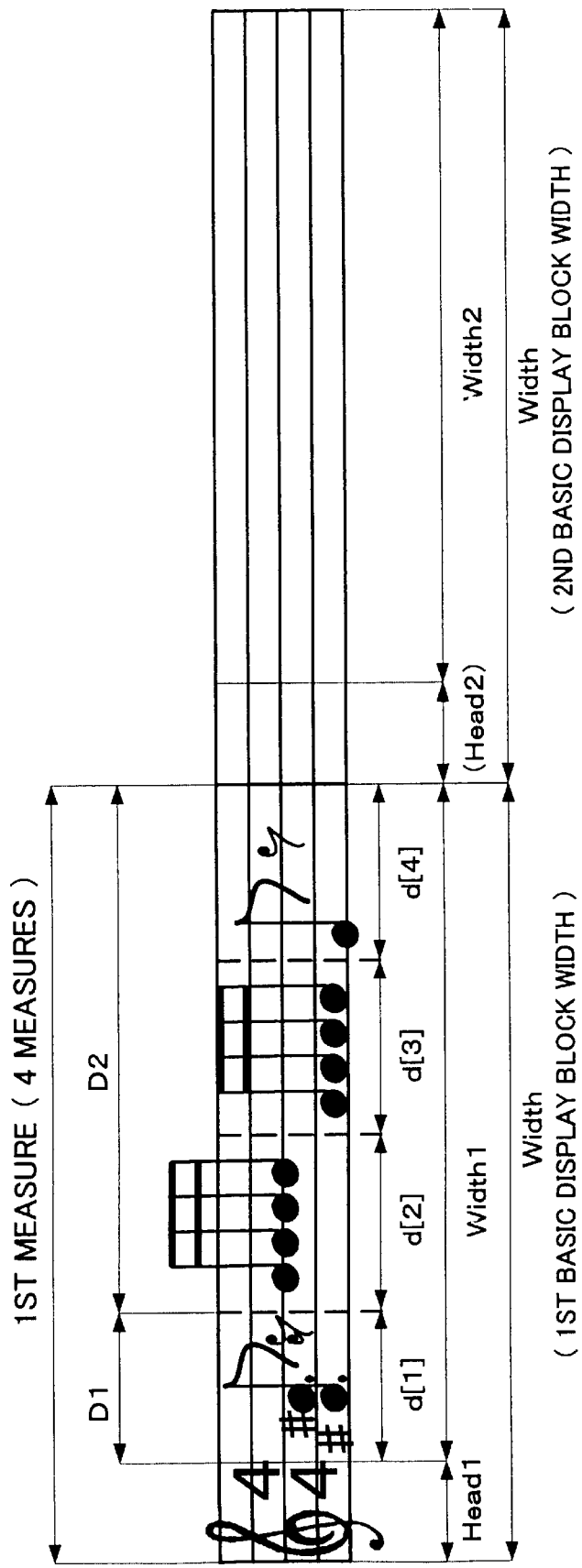
FIG. 7 is a conceptual diagram explanatory of parameters and the like to be used in the one-measure score mark analysis process shown in FIG. 6.

Now, with reference to FIGS. 6 and 7, a description is about the details of the one-measure score mark analysis process carried out at step S23 of the music-score-data creation process of FIG. 5. FIG. 6 is a flow chart showing an exemplary step sequence of the one-measure score mark analysis process, and FIG. 7 is a conceptual diagram explanatory of parameters and the like to be used in the one-measure score mark analysis process shown in FIG. 6. The diagram of FIG. 7 illustratively shows a case where all music scores for one measure can be placed within a first basic display block. Specific operations carried out in the one-measure score mark analysis process are set forth with reference to the flow chart of FIG. 6 and conceptual diagram of FIG. 7.

First, at step S31, the CPU 1 stores in advance respective display widths necessary for displaying the clef, key signature and time signature determined in the above-described music-score-data creation process (step S22 of FIG. 5) and for displaying the individual beats. As seen from FIG. 7, the CPU 1 in the instant embodiment stores in advance the display widths for the clef (G clef in the illustrated example of FIG. 7), key signature (not shown in FIG. 7) and time signature (4/4 in the illustrated example of FIG. 7) as a header display width Head1 (namely, Head1=the width of the clef+the width of the key signature+the width of the time signature), and the display widths for all the music score marks of the individual beats as beat display widths d[n] ("n" represents the number of the beats, and "d[n]" represents d[1]–d[4] in the illustrated example of FIG. 7). In addition to these, the "1st" beat and last beat ("4th" beat in the example of FIG. 7) in the first measure are stored in advance as a first displayed beat Start and last displayed beat End, respectively. At next step S32, a sum of the header display width Head1 and all the beat display widths d[1]–d[4] from the first displayed beat Start to the last displayed beat End is compared to the basic display block width Width, so as to determine whether the sum of the header display width Head1 and all the beat display widths d[1]–d[4] is equal to or smaller than the basic display block width Width. Or, a determination is made as to whether the first displayed beat Start is identical to the last displayed beat End.

If the sum of the header display width Head1 and all the beat display widths d[1]–d[4] is equal to or smaller than the basic display block width Width as determined at step S32 (YES determination at step S32), this means that all the music score marks from the first displayed beat Start to the last displayed beat End can be displayed within the basic display block, and thus all the music score marks are put in the basic display block at step S33. Or, if it has been determined that the first displayed beat Start is identical to the last displayed beat End (Yes determination at step S32), only a music score mark included in the remaining, last, beat is placed in the basic display block, at step S33, assuming that all the beats have been analyzed.

If, on the other has, it has been determined at step S32 that the sum of the header display width Head1 and all the beat display widths d[1]–d[4] from the first displayed beat Start to the last displayed beat End is greater than the basic display block width Width or that the first displayed beat Start is not identical to the last displayed beat End (NO determination at step S32), various values are set at step S34 in accordance with (Equation 2-1) to (Equation 2-5) below.

Idx=Idx1=Start　　　(Equation 2-1)

Diff=∞　　　(Equation 2-2)

Head2=0 or sum of the widths of the clef and key ignature　　　(Equation 2-3)

$$Width1 = Width - Head1 \quad \text{(Equation 2-4)}$$

$$Width2 = Width - Head2 \quad \text{(Equation 2-5)}$$

Here, (Equation 2-1) means setting an initial value of beat data Idx or Idx1 as the first displayed beat Start. (Equation 2-2) means initially setting a differential variable to infinity. Where the measure in question is set to be displayed dividedly across a plurality of successive display rows and thus there occurs a change in the display row halfway through the measure, the same clef, key signature, etc. as on the first row must be displayed again at the beginning of the next or second row. For this reason, a second header display width Head2 is calculated in advance as represented by (Equation 2-3). Namely, either the value "0" or the sum of the widths of the clef and key signature is set as the second header display width Head2. More specifically, if the measure is divided across the basic display blocks (i.e., first and second basic display blocks) of a same row, there is no need to again display the clef and key signature at the beginning of the second basic display block, and thus the value "0" is set as the second header display width Head2. However, if the measure is divided across the basic display blocks of different rows, there is a need to automatically insert the same clef, key signature and the like as put on the first row at the beginning of the basic display block of the second row, and thus the sum of the widths of the clef and key signature is set as the second header display width Head2. By thus previously setting the second header display width Head2, the clef, key signature and the like can be automatically displayed at the beginning of the basic display block of each row so that the music score can be displayed properly in compliance with the common score notation rules, even in the case where the measure is divided across many rows. Further, where the music piece data set includes musical time event data to change the musical time in the course of the performance of the music piece, such a key signature, time signature, etc. must be indicated in the music score, so that, in this case too, the sum of the widths of the clef and key signature is previously set as the second header display width Head2. However, for a portion of the music piece that is judged to be a cadenza (i.e., an unaccompanied solo passage usually used in an ending portion of the music piece), it is not necessary to indicate a key signature, time signature, etc. in the music score in such a manner to follow the music score notation rules, even if the music piece data set includes musical time event data; thus, in this case, the value "0" is set as the display width Head2. The judgement that there is a cadenza is made, for example, when there occurs musical time event data indicative of a musical time greater than 9/4 in the case of a music piece having a 4/4 time, or when there occurs musical time event data indicative of a musical time greater than 7/8 in the case of a music piece having an 8/8 time.

Further, at next step S35 of FIG. 6, the CPU 1 calculates a first display width D1 necessary for displaying the first displayed beat Start through the beat indicated by the beat data Idx, and a second display width D2 necessary for displaying a beat immediately following the beat indicated by the beat data Idx (i.e., Idx+1) through the last displayed beat End. Namely, in this instance, the necessary display width for displaying the first displayed beat Start all the way through the last displayed beat End is divided into the first display width D1 and second display width D2 with the beat indicated by the beat data Idx used as a demarcation point.

At following step S36, the calculated divided display width D1 is compared to a first remaining display width Width1 that is obtained by subtracting the header display width Head1 from the first basic display block width Width. If the first divided display width D1 is greater than the first remaining display width Width1 (YES determination at step S36), settings are made such that the first displayed beat Start through the beat indicated by the beat data Idx can be placed within the current basic display block, at step S37. In addition, (Idx+1) and the value of the second header display width Head2 are set as the first displayed beat Start and header display width, respectively. Upon completion of the operation at step S37, the CPU 1 reverts to step S32. For example, if settings have been made such that the first displayed beat Start through the beat indicated by the beat data Idx are placed within the first basic display block, the above-described operations at and after step S32 are repeated using the following (i.e., second) basic display block as a new first basic display block.

If, on the other hand, the first divided display width D1 is not greater than the first remaining display width Width1 (NO determination at step S36), then the divided display width D2 is compared to a second remaining display width Width2, at step S38. If the divided display width D2 is not greater than the second remaining display width Width2 (NO determination at step S38), a determination is made, at step S39, as to whether or not a difference between the two divided display widths D1 and D2 is equal to or greater than the variable Diff. If the difference between the two divided display widths D1 and D2 is equal to or greater than the variable Diff (YES determination at step S39), the CPU 1 goes to step S37, where settings are made such that the first displayed beat Start through the beat indicated by the beat data Idx1 are placed within the current basic display block and (Idx+1) and the value of the second header display width Head2 are set as the first displayed beat Start and header display width, respectively. Upon completion of the operation at step S37, the CPU 1 reverts to step S32. If the difference between the two divided display widths D1 and D2 is not equal to or greater than the variable Diff (NO determination at step S39), the CPU 1 goes to step S41, where the difference between the two divided display widths D1 and D2 is set as the variable Diff. After completion of the operation at step S41, or if the divided display width D2 is greater than the second remaining display width Width2 (YES determination at step S38), an operation is carried out at step S40 for renewing the beat data Idx with the current value of the beat data Idx and then incrementing the beat data Idx by one (i.e., Idx+1). After that, the CPU 1 reverts to step S35.

This and following paragraphs describe basic concepts concerning the above-described operations of steps S32 to S41. If music score marks corresponding to a plurality of beats constituting a measure are allocated to a plurality of the basic display blocks on a beat-by-beat basis, a difference between the divided display widths D1 and D2 (i.e., |D1−D2|) is calculated for each of a plurality of possible allocating combinations so that the music score marks in adjacent basic display blocks assume as uniform placement density as possible. Then, a selection is made of one of the allocating combinations which can minimize the calculated display width difference, and settings are made such that music score marks of one or more beats corresponding to the divided display width D1 based on the selected allocating combination are displayed within the first basic display block. For example, in the case of 4/4 time, the beats corresponding to the divided display widths D1 and D2 take the following three combinations. Namely, the first combination comprises a first beat (d[1]) allocated to the divided display width D1 and second to fourth beats (d[2]+d[3]+d

[4]) allocated to the divided display width D2, the second combination comprises first and second beats (d[1]+d[2]) allocated to the divided display width D1 and third and fourth beats (d[3]+d[4]) allocated to the divided display width D2, and the third combination comprises first to third beats (d[1]+d[2]+d[3]) allocated to the divided display width D1 and fourth beat (d[4]) allocated to the divided display width D2. By repeating the operations of steps S35, S36, S38, S39, S41, S40 and S35 or the operations of steps S35, S36, S38, S39, S40 and S35 in the one-measure score mark analysis process, the CPU 1 evaluates the difference between the divided display widths D1 and D2 for each of the combinations and selects one of the combinations that achieves the smallest display width difference.

If the operation of step S35 is carried out when the divided display width D1 in the first combination is not greater than the remaining display width Width1 (NO determination at step S36) and the divided display width D2 in the first combination is greater than the remaining display width Width2 (YES determination at step S38), a summed display width of the music score marks of the first and second beats (i.e., beat display widths d[1]+d[2]) is set as the divided display width D1, while a summed display width of the music score marks of the third and fourth beats (i.e., beat display widths d[3]+d[4]) is set as the divided display width D2. If answered in the affirmative at step S36, i.e. if the first divided display width D1 is greater than the first remaining display width Width1, this means that the first divided display width D1 in the second combination does not fall within the basic display block and thus the first divided display width D1 in the first combination (in this case, Start=Idx1=1) should be selected. Therefore, the CPU 1 goes to step S37, where it decides to put every beat from the first displayed beat Start through the Idx beat (in this case, only the first beat d[1]). After that, the CPU 1 reverts to step S32, where steps similar to the above-described are started with the next beat (in this case, d[2]) of the next basic display block. If, on the other hand, the first divided display width D1 is equal to or smaller than the first remaining display width Width1 as determined at step S36, the CPU 1 goes to step S38. Then, if answered in the negative at step S38, i.e. if the second divided display width D2 is equal to or smaller than the second remaining display width Width2, the CPU 1 goes to step S39. If answered in the affirmative at step S39, i.e. If the difference between the first and second divided display widths D1 and D2 is greater than the differential variable Diff, this means that the differential variable Diff for the last beat (i.e., Start=Idx1=1) is the smallest. Thus, the CPU 1 decides to put the first beat d[1] in the first basic display block and then reverts to step S32, where steps similar to the above-described are started with the next beat (d[2]) of the next basic display block.

If, on the other hand, the current difference between the first and second divided display widths D1 and D2 (i.e., |D1−D2|) is smaller than the last differential variable Diff as determined at step S39, the CPU 1 branches to step S41, where the current difference is set as the smallest differential variable Diff. After completion of the operation at step S41 or if an YES determination is made at step S38 (i.e., if the second divided display width D2 is greater than the second remaining display width Width2), the CPU 1 again carries out the operation of step S40 and then again goes to step S35 in order to evaluate the difference |D1−D2| in the third combination. By thus repeating the operations of steps S32 to S41 except for step S33, the music score marks of the beats constituting the measure are sequentially put in the basic display block on a beat-by-beat basis. Then, when the music score marks for all the remaining beats have been put in the single basic display block, or when the last beat has been reached, the CPU 1 decides to put the music score marks of all the remaining beats or of the last beat in the current basic display block, after which the one-measure score mark analysis process is brought to an end.

As described above, in the case where all music score marks included in a measure can not be put appropriately within a single basic display block, the instant embodiment divides the music score marks of the measure so that the divided score marks can be placed and displayed in a plurality of basic display blocks. Further, in addition to merely dividing the music score marks of the measure so as to place and display the divided score marks in the plurality of basic display blocks, the instant embodiment adjusts the display density of the music score marks in the individual basic display blocks.

Now, a description will be made about the details of the one-measure score mark analysis process, with reference to FIG. 7.

For convenience of description, let it be assumed here that the number of dots necessary for displaying any one of fundamental note marks (e.g., whole notes, half notes and quarter notes) and basic rest marks is four, the number of dots necessary for displaying any one of hooks to be added to the fundamental note marks (e.g., the hooks of eighth notes and sixteenth notes) is three, the number of dots necessary for displaying any one of note dots to be added to the fundamental note marks (e.g., the note dots of dotted quarter notes and dotted eighth notes) is two, and the number of dots necessary for displaying any one of accidental marks (e.g., sharps, flats and other marks used to temporarily raise or lower or return a particular note to its normal pitch at some enroute point of a music piece) is five. In such an instance, the necessary display widths for displaying the individual beats of the music score shown in FIG. 7 can be calculated as follows. Namely, the necessary display widths are: 21 dots for the first beat (d[1]) is 21 (i.e., 5 dots (accidental mark)×2+4 dots (note mark)+3 dots (hook: two dots for each note dot are included in the indication of the hook)); 16 dots for each of the second beat (d[2]) and third beat (d[3]) (i.e., 4 dots (note mark)×4); and 11 dots for the fourth beat (d[4]) (4 dots (note mark)+3 dots (hook)+4 dots (rest mark). Therefore, the total necessary display width for displaying all the music score marks of the first measure shown in FIG. 7 equals 64 dots (i.e., 21+16+16+11). As stated above, if the thus-calculated total display width necessary for displaying the entire measure is smaller than the first remaining display width Width1 obtained by subtracting the header display width Head1 from the first basic display block width Width, then all the music score marks in the measure can be displayed appropriately within the first basic display block. For example, where the remaining display width Width1 is 80 dots, the total display width, i.e. 64 dots, necessary for displaying the entire measure can be put in the first basic display block. Thus, in this case, all the music score marks in the measure can be displayed appropriately within the first basic display block without having to be divided at all.

If, on the other hand, the calculated total display width necessary for displaying the entire measure is greater than the first remaining display width Width1 obtained by subtracting the header display width Head1 from the first basic display block width Width, all the music score marks in the measure can not be displayed appropriately within the first basic display block, so that there arises a need to divide and allocate the music score marks in the measure to a plurality of the basic display block widths. For example, if the remaining display width Width1 is only 50 dots, the total display width, i.e. 64 dots, necessary for displaying the entire measure can not be put in the first basic display block, and thus the music score marks in the measure has to be displayed dividedly across a plurality of the basic display blocks. For the score mark division, the 37 dots for the first and second beats (i.e., 21+16 dots) in the illustrated example of FIG. 7 are allocated to the first basic display block, and the 27 dots for the third and fourth beats (i.e., 16+11 dots) are allocated to the second basic display block. Although the 21 dots for the first beat may be allocated to the first basic display block with the 43 dots for the second to fourth beats (i.e., 16+16+11 dots) allocated to the second basic display block, such allocation results in significant non-uniform display density between the first basic display block and the second basic display block (with the display density in the second basic display block much greater than that in the first basic display block), which would unavoidably make it difficult for the user to view the score marks displayed on the display device; thus, such allocation is not employed in practice. Note that allocating the 52 dots for the first to third beats (i.e., 21+16+16 dots) to the first basic display block with only the 11 dots for the fourth beat allocated to the second basic display block is not possible, because the necessary number of dots for the first to third beats exceeds the 50 dots of the remaining display width Width1.

Also, in a case where the remaining display width Width1 is 50 dots and the necessary numbers of dots for displaying the music score marks for the individual beats are 60, 15, 15 and 15, respectively, the music score marks in the measure have to be displayed dividedly because the necessary display width, 105 dots (i.e., 60+15+15+15 dots), can not be appropriately placed within the first basic display block. In this case, however, it is not possible to allocate the 60 dots for the first beat to the first basic display block with the 45 dots for the second to fourth beats (i.e., 15+15+15 dots) allocated to the second basic display block, because the 60 dots for the first beat alone exceed the 50 dots of the remaining display width Width1. Further, allocating the 75 dots for the first and second beats (i.e., 60+15 dots) to the first basic display block with the 30 dots for the third and fourth beats (i.e., 15+15) allocated to the second basic display block, or allocating the 90 dots for the first to third beats (i.e., 60+15+15 dots) to the first basic display block with only the 15 dots for the fourth beat allocated to the second basic display block is not possible because the dots allocated to the first basic display block alone exceed the 50 dots of the remaining display width Width1. Namely, in the case where even only one beat (i.e., first beat) can not be put in the first basic display block, the instant embodiment compulsorily allocates every music score mark for the first beat to the first basic display block, since the one beat is a minimum division unit that can not be divided. In such a case, some of the music score marks for the first beat will be undesirably displayed overlappingly due to the fact that the necessary number of dots for displaying every music score mark for the first beat are 60 dots greater than the 50 dots of the remaining display width Width1.

Similarly, in a case where the remaining display widths of the first and second basic display blocks are each 50 dots and the necessary numbers of dots for displaying the music score marks for the individual beats in a 5/4-time music piece are 20, 25, 40, 20 and 10, respectively, the necessary display width for displaying the first measure are 115 dots (i.e., 20+25+40+20+10) that can not be fully put in the first basic display block, and thus the music score marks in the measure have to be displayed dividedly. However, it is not possible to allocate the 20 dots for the first beat to the first basic display block with the 95 dots for the second to fifth beats (i.e., 25+40+20+10 dots) allocated to the second basic display block, because the 95 dots for the second to fifth beats exceed the 50 dots of the remaining display width Width2 of the second basic display block. Further, allocating the 45 dots for the first and second beats (i.e., 20+25 dots) to the first basic display block with the 70 dots for the third to fifth beats (i.e., 40+20+10) allocated to the second basic display block is not possible either, because the dots for the third to fifth beats exceed the 50 dots of the remaining display width Width2 of the second basic display block. Furthermore, allocating the 85 dots for the first to third beats (i.e., 20+25+40 dots) to the first basic display block with the 30 dots for the fourth and fifth beats (i.e., 20+10) allocated to the second basic display block is also not possible, because the dots for the first to third beats exceed the 50 dots of the remaining display width Width1 of the first basic display block. Thus, in such cases, as many beats as possible are allocated to the first basic display block, and the remaining beats are further divided and allocated to the second and other basic display blocks. Specifically, in this instance, the first and second beats, i.e. 25+25=45 dots, are allocated to the first basic display block, and the third to fifth beats, i.e. 40+20+10=70 dots, are further divided in such a manner that the third beat (40 dots) is allocated to the second basic display block and the fourth and fifth beats (20+10=30 dots) are both allocated to the third basic display block.

Figure 8:
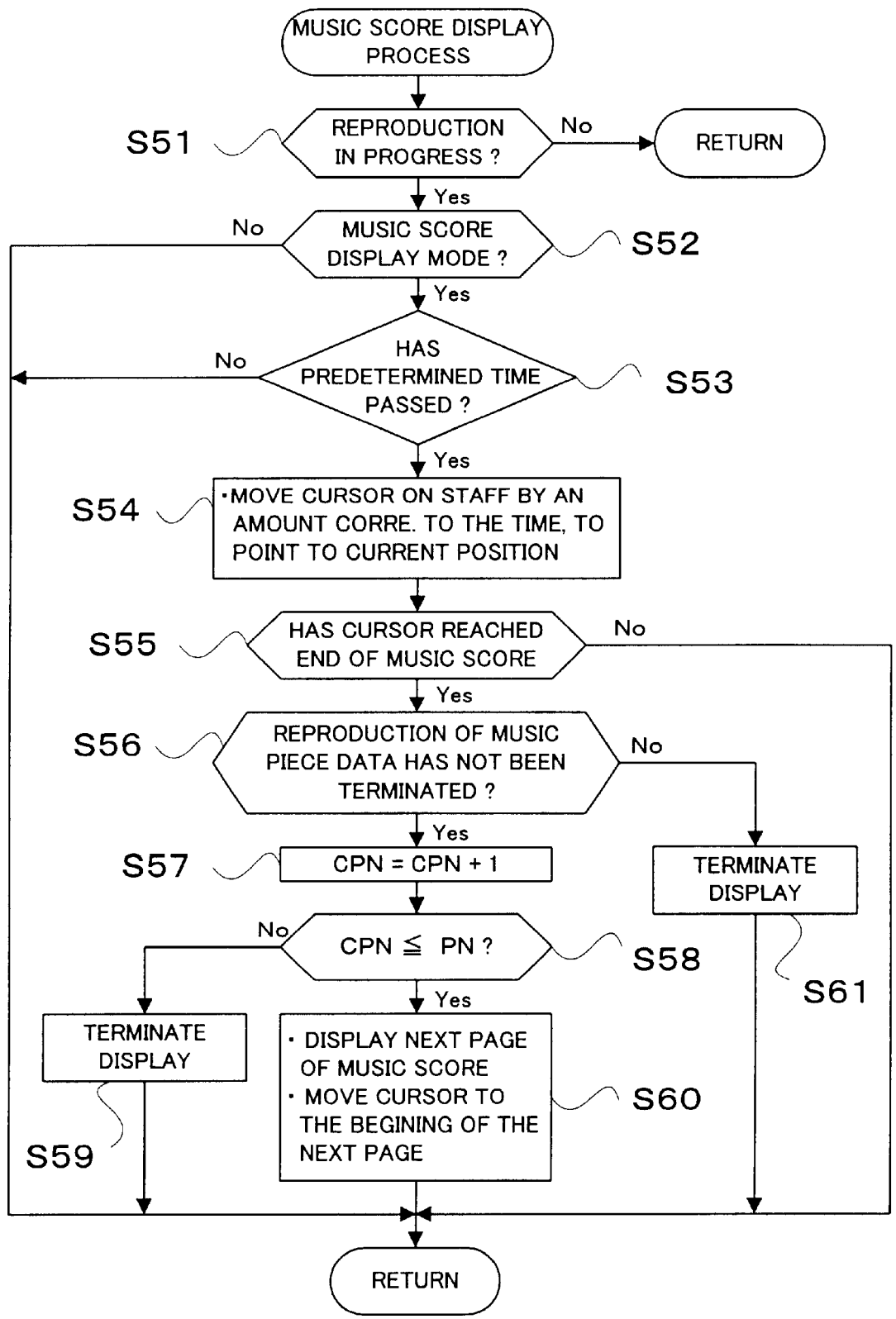
FIG. 8 is a flow chart showing an exemplary step sequence of a music score display process carried out in the main processing of FIG. 3.

The following paragraphs describe the details of the music score display process carried out at step S4 of the above-described main processing of FIG. 3, with reference to FIG. 8. FIG. 8 is a flow chart showing an exemplary step sequence of the music score display process.

First, at step S51 of FIG. 8, a determination is made as to whether a music data set selected by the user is now being reproduced, i.e. whether an automatic performance, based on a music piece data set selected by the user depressing the automatic performance start switch, is currently in progress. If no music data set is now being reproduced (NO determination at step S51, this means that there is no need to display a music score in accordance with progression of the performance of the music piece, so that the music score display process is brought to an end without executing any other operation. If, on the other hand, a user-selected music piece data set is now being reproduced (YES determination at step S51), it is further determined at step S52 whether the user has selected the mode of displaying the score of the music piece (see step S12 of FIG. 4). If answered in the negative at step S52, it is not necessary to display the music score, so that the music score display process is brought to an end without executing any other operation. If, on the other hand, the user has selected the mode of displaying the score of the music piece as determined at step S52, it is further ascertained at step S53 whether or not a predetermined time has passed. If the predetermined time has not passed yet (NO determination at step S53), the CPU 1 judges that there has not yet arrived timing to change or update the current music score display and then terminates the music score display process. Namely, in this case, the current contents of the music score display, along with the cursor, are left unchanged. If, on the other hand, the predetermined time has passed (YES determination at step S53), the cursor is moved on the displayed music score, at step S54, by an amount corresponding to the predetermined time, so as to point to a current automatically-performed position on the music score.

At next step S55, a determination is made whether the cursor has moved up to the end of the current displayed page of the music score. If the cursor has not yet reached the end of the current displayed page of the music score (NO determination at step S55), it is not yet necessary to change the displayed music score to another page, so that the music score display process is brought to an end. If the cursor has reached the end of the current displayed page of the music score (YES determination at step S55), it is further determined at step S56 whether the reproduction of the music piece data set has not been terminated. If answered in the negative at step S56, i.e., if the reproduction of the music piece data set has been terminated (NO determination at step S56), the music score display is terminated in response to termination of the automatic performance, at step S61. If the reproduction of the music piece data set has not yet been completed (YES determination at step S56), the page number of the music score is incremented by one, at step S57, to proceed to the next page of the music score. If the thus-incremented or current page number CPN is greater than the total number PN of pages of the music score (NO determination at step S58), the music score display is terminated in response to termination of the automatic performance, at step S69. If, on the other hand, the thus-incremented or current page number CPN is equal to or smaller than the total number PN of pages of the music score (YES determination at step S58), the CPU 1 goes to step S60 in order to display the next page of the music score and put the cursor at the start position of the next page.

In the above-mentioned manner, the music score is displayed in accordance with page-by-page music score mark data or indications created in the above-described music-score-data creation process of FIG. 5.

It is preferable that tuplets be displayed without being divided at all because the non-divided tuplets are much easier for the user to view.

Whereas the embodiment has been described above as creating a music score of an entire music piece on the page-by-page basis in response to an automatic performance start instruction, the present invention is not so limited. For example, portions of a music score corresponding to predetermined sections of the music piece may be created, prior to execution of the automatic performance process, in accordance with music piece data of the predetermined sections. Further, there may be provided, on the panel operator unit, a dedicated switch or operator for creating page-by-page music score data to be used for a music score display so that only the music score data are created in advance in response to operation of the dedicated switch or operator instead of being created in response to the automatic performance start instruction.

Furthermore, whereas the embodiment of FIG. 8 has been described above as displaying all music score marks of a measure within a single basic display block, the present invention is not so limited, and music score marks of a measure may be displayed using a plurality of basic display blocks; for example, music score marks of a first half of a measure may be displayed in one basic display block while music score marks of a second half of the measure are displayed in another basic display block (namely, in this case, all the music score marks of the measure may be displayed using two basic display blocks). This arrangement is very useful in that it can appropriately vary a necessary display width for displaying all music score marks of a measure; for example, in the case of a measure having too many music score marks, the arrangement allows the music score marks to be displayed using three or four basic display blocks, while in the case of a measure having only a small number of music score marks, it allows the music score marks to be displayed using only one basic display block.

Furthermore, whereas the embodiment has been described above only in relation to a music score display for a one-hand performance part, the above-described processes may be applied to display a music score for a both-hand performance part. In this case too, the present invention adjusts the display width necessary for displaying individual beats, in accordance with the number and dimensions of music score marks. Namely, when a grand staff is to be displayed and the treble and bass staves have two notes appearing at same timing, the two notes have to be placed in a same horizontal position, which makes it necessary to uniformize a beat-by-beat display width between the treble and bass staves. Thus, where a plurality of notes of different performance parts appear at same performance timing, one of the notes that requires a greatest display width is made a representative or reference note for that timing. For example, if a right-hand performance part requires 60 dots while a left-hand performance part requires 25 dots, then the display width used in the above-described one-measure score mark analysis process is set to the 60 dots necessary for the right-hand performance part. By so doing, the music score display can be executed properly without having to differentiating the performance timing between the right-hand performance part and left-hand performance part.

In the case where the music-score-display control apparatus is applied to an electronic musical instrument as above, the electronic musical instrument may be of any other type than the keyboard type, such as a stringed instrument, wind instrument or percussion instrument type. It should also be appreciated that the electronic musical instrument is not limited to the type where the tone generator device, automatic performance device, etc. are incorporated together within the body of the electronic musical instrument, and may be of another type where the tone generator device, automatic performance device, etc. are provided separately from each other but can be operatively connected with each other via MIDI interfaces and communication facilities such as a communication network. Further, the electronic musical instrument may comprise a combination of a personal computer and application software, in which case various processing programs may be supplied from a storage medium, such as a magnetic disk, optical disk or semiconductor memory or via a communication network. Further, the music-score-display control apparatus of the invention may be applied to a karaoke apparatus, game apparatus, portable communication terminal such as a mobile cellular phone, player piano, etc.

It should also be appreciated that the music piece data may be in any desired format other than the format shown in FIG. 2, such as: the "event plus absolute time" format where the time of occurrence of each performance event is represented by an absolute time within the music piece or a measure thereof; the "event plus relative time" format where the time of occurrence of each performance event is represented by a time length from the immediately preceding event; the "pitch (rest) plus note length" format where each performance data is represented by a pitch and length of a note or a rest and a length of the rest; or the "solid" format where a memory region is reserved for each minimum resolution of a performance and each performance event is stored in one of the memory regions that corresponds to the time of occurrence of the performance event. Furthermore, where music piece data for a plurality of channels are handled in the present invention, the music piece data for the plurality of channels may be stored together in a mixture or the music piece data for the channels may be separated from each other on a track-by-track basis.

Furthermore, the performance music piece data may be processed by any suitable scheme, such as one where the processing period of the music piece data is varied in accordance with a currently-set tempo, one where the value of each timing data being automatically performed is varied in accordance with the currently-set tempo with the processing period kept constant, or one where the way of counting the timing data in the music piece data is varied per processing in accordance with the currently-set tempo with the processing period kept constant. Moreover, the time-serial music piece data may be stored in successive storage regions of a memory, or music piece data stored dispersedly in non-successive storage regions may be managed as successive data. Namely, it is only necessary that the music piece data be capable of being managed as time-serial data, and it does not matter whether or not the music piece data are actually stored in succession in a memory. Moreover, the display device for displaying a music score may be other than an electronic device such as a CRT or liquid crystal display; for example, the display device may be of a type using a printer to print a music score on a sheet of paper.

In summary, the present invention is characterized by displaying a music score in a divided manner as necessary and uniformizing display density of music score marks in adjacent basic display blocks. With such arrangements, even in the case of a music piece having a great many music score marks in a measure, a user can view the displayed music score with enhanced visibility and reliability.

The present invention relates to the subject matter of Japanese Patent Application No. 2001-054923 filed on Feb. 28, 2001, the disclosure of which is expressly incorporated herein by reference in its entirety.

What is claimed is:

1. A music-score-display control apparatus comprising:
 a display device;
 a supply section that supplies performance data of a music piece; and
 a processor coupled with said display device and said supply section, said processor being adapted to:
  control said display device to display a music score using at least one predetermined basic display block;
  on the basis of the performance data supplied by said supply section, detect music score marks included in each of predetermined music piece sections of the music piece; and
  for each of the predetermined music piece sections, set the music score marks detected therein in a single predetermined basic display block if the detected music score marks of the respective music piece section are fully displayable therein and dividedly in a plurality of the basic display blocks if the detected music score marks of the respective music piece section are not fully displayable in the single predetermined basic display block.

2. A music-score-display control apparatus as claimed in claim 1, wherein each of the predetermined music piece sections is a measure section consisting of at least one measure, and wherein when a display width necessary for displaying music score marks included in a given measure section is greater than a display width of the basic display block, said processor divides, at a given beat position of the given measure section, the music score marks in the given measure section into two or more groups and places the music score marks of the divided groups in respective predetermined basic display blocks.

3. A music-score-display control apparatus as claimed in claim 1, wherein said processor sets the music score marks in each of the predetermined music piece sections in one or more of the predetermined basic display blocks so that the musical score marks are displayed with uniform display density.

4. A music-score-display control apparatus as claimed in claim 1 wherein when the music score marks included in one of the music piece sections are to be placed in the basic display blocks of at least two different rows, said processor puts a same predetermined music score mark as put at the beginning of a first one of the rows at the beginning of the basic display block of each succeeding one of the rows.

5. A music-score-display control apparatus as claimed in claim 1, wherein said processor is further adapted to display a predetermined indicator, moving in accordance with progression of the music piece, in correspondence with a music score mark displayed on said display device.

6. A music-score-display control apparatus as claimed in claim 5 wherein a moving speed of the predetermined indicator is varied in accordance with a particular number of beats represented by the music score marks placed in each of the basic display blocks.

7. A music-score-display control apparatus as claimed in claim 1 wherein when a predetermined type of music score mark is included in the detected music score marks, said processor performs control to not display the predetermined type of music score mark.

8. A music-score-display control method comprising:
 a step of supplying performance data of a music piece;
 a step of, on the basis of the performance data supplied by said step of supplying, detecting music score marks included in each of predetermined music sections of the music piece; and
 a step of controlling a display device to display the music score marks detected in each of the music sections using at least one predetermined basic display block,
 wherein said step of controlling the display device includes a step of setting the detected music score marks in a single predetermined basic display block if the detected music score marks of the respective music section are fully displayable therein and dividedly in a plurality of the basic display blocks if the music score marks of the respective music section are not fully displayable in the single predetermined basic display block.

9. A music-score-display control method as claimed in claim 8, further comprising a step of displaying a predetermined indicator, moving in accordance with progression of the music piece, in correspondence with a music score mark displayed on said display device.

10. A computer readable medium having program codes recorded thereon for:
 reading performance data of a music piece;
 detecting music score marks included in each of predetermined music sections of the music piece based on the performance data read; and controlling a display device to display the music score marks detected in each of the music sections using at least one predetermined basic display block, wherein the detected music score marks of each of the music sections are set in a single predetermined basic display block if the detected music score marks of the respective music section are fully displayable therein and dividedly in a plurality of predetermined basic display blocks if the detected music score marks of the respective music section are not fully displayable in the single predetermined basic display block.

11. A computer readable medium according to claim 10, further including a program code recorded thereon for displaying a predetermined indicator, moving in accordance with progression of the music piece, in correspondence with a music score mark displayed on said display device.

* * * * *